May 8, 1945.  P. J. HURLEY  2,375,557
MICROMETER CALIPER
Filed April 12, 1943
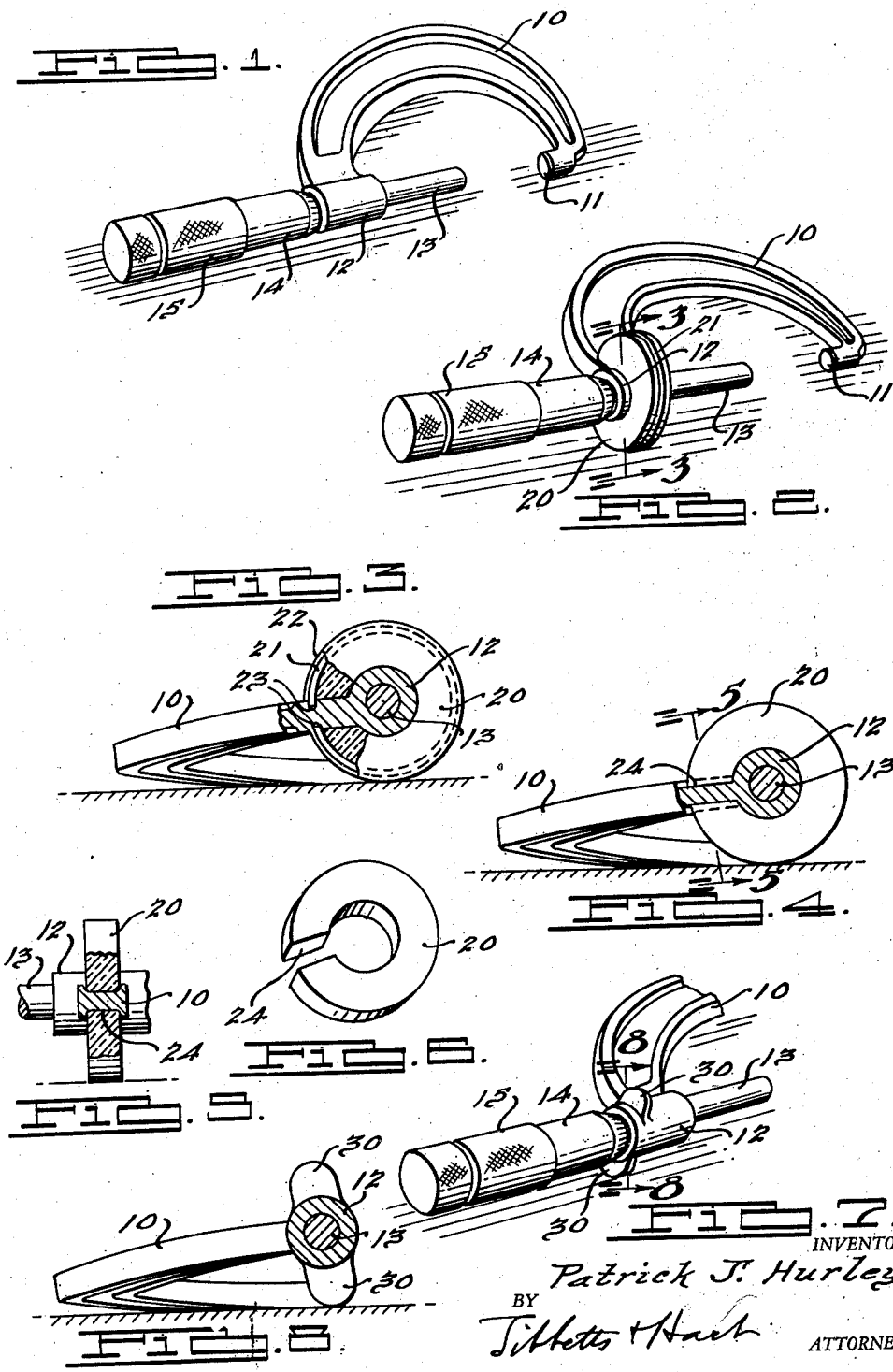
INVENTOR
Patrick J. Hurley.
BY
Tibbetts + Hart
ATTORNEY Patented May 8, 1945

2,375,557

UNITED STATES PATENT OFFICE 2,375,557

MICROMETER CALIPER

Patrick J. Hurley, Gratiot Township, Wayne County, Mich., assignor to Packard Motor Car Company, Detroit, Mich., a corporation of Michigan Application April 12, 1943, Serial No. 482,691

7 Claims. (Cl. 33—167)

This invention relates to micrometer calipers and particularly to means for protecting calipers from injury when being placed on a work bench or other surface.

The conventional outside micrometer caliper is formed with a C- or U-frame with an anvil at one end and with a spindle, sleeve, and thimble at the other end. The thimble is usually larger than the spindle end of the frame and when the caliper is placed at rest on a flat surface the thimble usually forms one point of support and the frame another. Since calipers are not always laid down carefully, particularly in these days when so many untrained or new workmen are using them, the calipers are often injured so that they will not do their work accurately. Many of the calipers are required to measure a part to .0001 of an inch, which means that a very slight misalignment or other injury to the spindle or sleeve or thimble will throw the measurement off and inaccurate inspection results.

It is one of the objects of this invention to so construct the conventional outside caliper that when it is laid on the bench it wil rest, not on the thimble or sleeve or any part attached to the spindle, but upon two points of the frame. This will relieve the spindle of the shock due to roughly placing the caliper on the bench with the thimble as a part of its support.

Another object of the invention is to provide a calipe rwith a device which may be attached to it and detached from it and when so attached it will support the frame of the caliper away from the supporting surface and thus prevent the spindle and thimble from being subjected to the shock of contact with the metal work bench.

Other objects of the invention will appear from the following description taken in connection with the drawing, which forms a part of this specification, and in which:

Fig. 1 is a view of a conventional micrometer caliper, resting on a flat surface, such as a work bench, with the thimble supporting one part of the caliper and the frame another part;

Fig. 2 is a similar view of a caliper embodying this invention, this caliper also resting on a flat surface but with the thimble in elevated position;

Fig. 3 is a sectional view substantially on the line 3—3 of Fig. 2;

Fig. 4 is a view similar to Fig. 3 illustrating a second form of rest member for the caliper;

Fig. 5 is a sectional view substantially on the line 5—5 of Fig. 4;

Fig. 6 is a perspective view of the rest member illustrated in Figs. 4 and 5;

Fig. 7 shows a caliper having a third form of rest member; and

Fig. 8 is a section substantially on the line 8—8 of Fig. 7.

Referring to the drawing, Fig. 1 illustrates the conventional micrometer caliper having a frame 10 with an anvil 11 at one end and a boss 12 at its spindle end. This frame is of the C-type. A spindle 13 is mounted in the boss 12 and this spindle is connected to a sleeve 14 and a thimble 15 in the usual manner so that as the thimble is turned the spindle 13 is adjusted relatively to the anvil 11 and the distance therefrom is indicated in thousandths or ten-thousandths of an inch on the sleeve 14.

As this conventional caliper is laid down on a flat surface of a metal bench as shown, it is liable to injury by reason of the fact that the thimble 15 strikes the bench and, perhaps minutely, throws the spindle 13 or the sleeve 14 out of adjustment.

Referring to Fig. 2, the parts 10 to 15 are the same as in Fig. 1, but there has been added to the frame at the spindle end thereof a rest member 20, in this case a detachable rest member, which supports that end of the frame off of the bench or support surface. The frame 10 being heavier than the sleeve 14 and thimble 15, the other point of support of the caliper is adjacent the anvil end of the frame so that the sleeve 14 and the thimble 15 are supported in an elevated position and do not touch the bench as the caliper is placed on it.

The rest member 20 is in the form of a split ring and it surrounds the boss 12 with its two ends resting on the frame 10 adjacent the boss. This is particularly well shown in Figs. 2 and 3. The ring may be put in place by threading it over the spindle 13 and moving it lengthwise of the boss 12, the exterior surface of which it fits easily.

Friction may be depended upon to retain the split ring in position but it is preferred to detachably secure it by the use of a split metal ring 21 which rests in a circumferential groove 22 in the split ring 20 and the ends of the ring 21 snap into recesses 23 in the frame 10 adjacent the boss.

With the above arrangement the rest member 20 may be removed if, as in rare instances, the caliper is to be used in measuring a part with which the ring 20 would interfere. After such use the ring may be replaced and the caliper will again be protected.

The ring or rest member 20 is preferably formed of a plastic material so that the caliper is slightly cushioned as it is laid on the bench, but it may be made of metal or any other desired material.

In the form of the invention shown in Figs. 4, 5, and 6 the cross section of the frame 10 well up to the boss 12 is of I-shape and the rest ring 20 is made slightly elastic so that its ends 24 will drop into the recessed part of the frame adjacent the boss 12 and thereby retain the rest ring in position on the boss. This is particularly well shown in Figs. 4 and 5 and the form of the ring is shown in Fig. 6.

In Fig. 7 the means for raising the spindle end of the frame off the bench is in the form of two protuberances or enlargements 30 on opposite sides and adjacent the sleeve end of the boss 12. These enlargements are shown as formed integrally with the boss and they are made so that they extend laterally farther than the thimble 15 from the axis of the spindle. Thus whichever side of the caliper is laid down one of these protuberances will support the spindle end of the frame away from the work bench and the spindle, sleeve, and thimble will thereby be protected from injury.

In the several forms of the invention it will be seen that the caliper, when laid on the bench, will rest on the surface thereof at two points, one point at the spindle end of the frame just beneath the outer end of the boss 12, and the other point adjacent the anvil end of the frame. This latter point will be slightly away from the extreme anvil end, the distance depending upon the size or weight of the frame itself, but in any event the frame is heavier than the sleeve and thimble and therefore the caliper will not tilt up at the other end and rest on the end of the thimble. This two-point resting of the caliper on the bench is clearly illustrated in Figs. 2, 3, 4, and 8, and in Fig. 1 the rest of the thimble 15 on the bench is clearly shown.

As an incident to the construction of the invention, the caliper may be more easily picked up from the bench and consequently it does not slide along on the bench as is sometimes the case with the conventional caliper, which is hard to grasp.

It will be understood that various forms of the invention other than those described above may be used without departing from the spirit or scope of the invention.

What is claimed is:

1. A micrometer caliper comprising a frame having a boss at one end and recesses on opposite sides adjacent said boss, a split rest ring surrounding the boss, and a resilient split ring having its ends in said recesses and detachably retaining said rest ring in place.

2. A micrometer caliper comprising a frame of substantially I-section and having a boss at its spindle end, and a split ring surrounding the boss and having its ends extending into the thin portion of the frame section thereby retaining it in position.

3. A micrometer caliper comprising a frame, an anvil at one end thereof, a spindle, sleeve and thimble at the other end thereof, said frame formed with a boss at its spindle end, and a split ring surrounding said boss and holding the ring surrounding the boss and holding the thimble away from the supporting surface on which the caliper rests.

4. A micrometer caliper comprising a frame having a spindle boss at its spindle end and recessed adjacent said boss, and a split ring of yielding material surrounding the boss and having an end extending into a recess of the frame, thereby being retained in position.

5. A micrometer caliper comprising a frame, an anvil at one end thereof, a spindle, sleeve and thimble at the other end thereof, said frame formed with a boss at its spindle end, and a ring of yielding material surrounding the boss and holding the thimble away from the supporting surface on which the caliper rests.

6. A micrometer caliper comprising a frame having an anvil end and a spindle end, a spindle and thimble at the spindle end of the frame, and a rest member in the form of an enlargement at the spindle end of the frame, said enlargement being of such form as to constitute one of two points of support for the caliper when lying on a flat surface, the other point of support being the anvil end of the frame, and to support the caliper with its thimble in elevated position.

7. A micrometer caliper comprising a frame having an anvil end and a spindle end, a spindle and thimble at the spindle end of the frame, and a rest member in the form of an integral enlargement of the spindle end of the frame, said enlargement being of such form as (a) to constitute one of two points of support for the caliper when lying on a flat surface, the other of said two points of support being the anvil end of the frame, and (b) to support the caliper with its thimble in elevated position when so lying on a flat surface.

PATRICK J. HURLEY.